United States Patent
Sonoda et al.

(10) Patent No.: US 6,851,002 B1
(45) Date of Patent: Feb. 1, 2005

(54) PROCESSING DEVICE WITH PARALLEL MOUNTING REGIONS FOR COMPONENT EXCHANGE

(75) Inventors: Shinya Sonoda, Kyoto (JP); Daisuke Tachibana, Kyoto (JP); Masahiro Akagi, Kyoto (JP); Mitsuru Matsumura, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 09/647,341

(22) PCT Filed: Mar. 31, 1999

(86) PCT No.: PCT/JP99/01668
§ 371 (c)(1),
(2), (4) Date: Nov. 30, 2000

(87) PCT Pub. No.: WO99/52029
PCT Pub. Date: Oct. 14, 1999

(30) Foreign Application Priority Data

Apr. 1, 1998 (JP) .............................. 10-87853

(51) Int. Cl.[7] ................................. G06F 9/00
(52) U.S. Cl. ................ 710/104; 710/301; 713/100
(58) Field of Search ............... 710/301–304, 710/104; 713/1–100

(56) References Cited

U.S. PATENT DOCUMENTS

| | | | | |
|---|---|---|---|---|
| 5,297,272 A | * | 3/1994 | Lu et al. | 710/301 |
| 5,384,692 A | * | 1/1995 | Jaff | 361/807 |
| 5,455,927 A | * | 10/1995 | Huang | 710/305 |
| 5,490,279 A | * | 2/1996 | Golbert et al. | 712/1 |
| 5,515,514 A | * | 5/1996 | Dhuey et al. | 710/301 |
| 5,586,270 A | * | 12/1996 | Rotier et al. | 710/301 |
| 5,617,546 A | * | 4/1997 | Shih et al. | 710/307 |
| 5,848,250 A | * | 12/1998 | Smith et al. | 710/300 |
| 5,898,857 A | * | 4/1999 | Beaman et al. | 710/113 |
| 6,292,859 B1 | * | 9/2001 | Santiago | 710/107 |

FOREIGN PATENT DOCUMENTS

| | | |
|---|---|---|
| JP | 59017641 A | 1/1984 |
| JP | 62278657 A | 3/1987 |
| JP | 01320536 A | 12/1989 |
| JP | 05341969 A | 12/1993 |
| JP | 07271563 A | 10/1995 |
| JP | 09311818 A | 12/1997 |
| WO | WO99/52029 | 10/1999 |

* cited by examiner

*Primary Examiner*—Paul R. Myers
(74) *Attorney, Agent, or Firm*—Dickstein Shapiro Morin & Oshinsky LLP (57) ABSTRACT

On a circuit board 11 there are provided, other than a comparison circuit 12 mounting region, dictionary ROM mounting regions 18a and 18b and microprocessor mounting regions 19a and 19b, with an address bus 16 and a data bus 17 each connected to mounting regions 18a and 18b in parallel and to mounting regions 19a and 19b in parallel. Initially, a dictionary ROM 13a and microprocessor 15a are mounted on mounting regions 18a and 19a, respectively, and when the current version is to be upgraded a dictionary ROM 13b having dictionary data partially changed to do so is mounted in mounting region 18b and a microprocessor 15b having a program partially changed to do so is mounted in mounting region 19b. Consequently, there can be provided an image processing device that can ensure a high level of mounting-strength and can also readily allow for exchanging a component thereof and upgrading its version.

9 Claims, 10 Drawing Sheets

PROCESSING DEVICE WITH PARALLEL MOUNTING REGIONS FOR COMPONENT EXCHANGE

TECHNICAL FIELD

The present invention relates to data processing devices and image processing devices having mounted on a circuit board a non-volatile memory and a microprocessor that store a program, data and the like.

BACKGROUND ART

Figure 1:
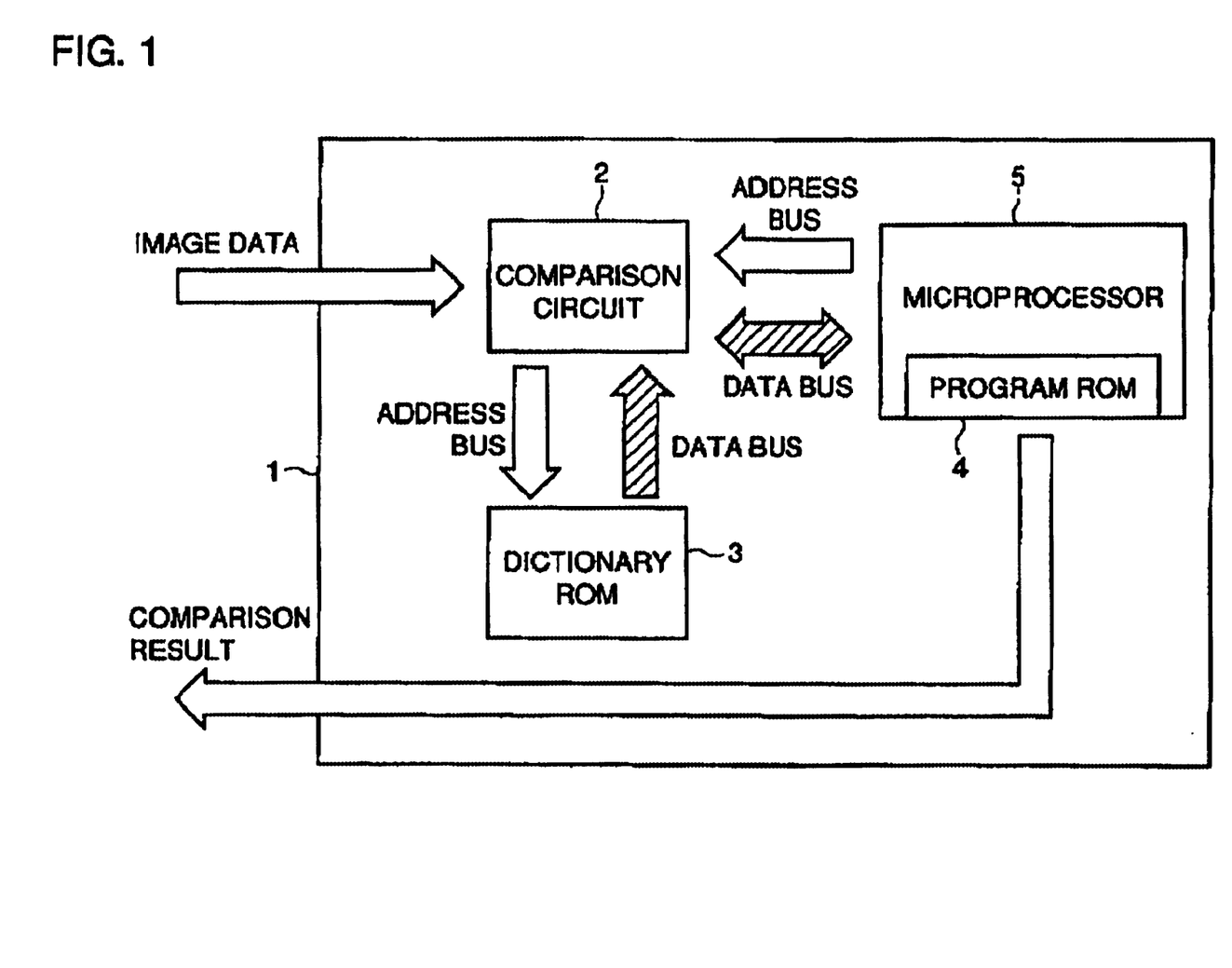
FIG. 1 shows a typical image processing device.

For example in a conventional image processing device as shown in FIG. 1 for example for character recognition there are mounted on a circuit board 1 a microprocessor 5 incorporating therein a comparison circuit 2, a dictionary ROM 3 and a program ROM 4. In this image processing device, dictionary ROM 3 stores feature values of a character, and when comparison circuit 2 receives a character of image data input, comparison circuit 2 compares it with the dictionary ROM 3 data, referring to the ROM 3 data. Microprocessor 5 refers to the program ROM 4 content to set a parameter for comparison circuit 2 for example for compressing and thus comparing input image data and also outputs a comparison result.

If in an image processing device of this type a system requires an additional function or it has a function to be changed, i.e., its version needs to be upgraded the device's non-volatile memory and microprocessor storing a program, data and the like therein need to be changed.

Accordingly, non-volatile memories, microprocessors and similar components that may be changed in the future are conventionally mounted on a circuit board via an IC socket and removed and inserted as required. Alternatively, a non-volatile memory, a microprocessor and the like that are soldered directly to a substrate are removed by melting the solder and another non-volatile memory, another microprocessor and the like are instead mounted on the substrate.

Exchanging components mounted on a circuit board via an IC socket, as conventional, however, is disadvantageous since:

① If the IC socket's contact point is not clean it does not provide reliable contact, resulting in an erroneous operation;

② The IC socket is large in size (particularly in its height direction) and is thus an obstacle in miniaturizing the equipment of interest;

③ Most of surface-mounting IC sockets have a structure with an IC lead held by a screw, a spring or the like. As such, vibration and hence impact would prevent the IC socket from providing reliable contact and thus cause an erroneous operation; and ④ Using an IC socket increases the cost.

Removing solder to remove a component and then again soldering another component is disadvantageous, since:

(a) Solder is melt by applying hot air to the substrate to heat it. As such, a wiring pattern corresponding to copper foil can peels and thus disconnects and the substrate can thus not be used. Furthermore, even if removing a component does not disconnect the wiring pattern, the heat applied would reduce the pattern's strength and the pattern thus could disconnect when the device being used vibrates and hence receives impact. In particular, for a surface-mounting component its mounting region does not have a hole, which would result in an insufficient strength and the copper foil readily peeling;

(b) If the hot air or the like heating the substrate also heats a component that does not need to be changed, the component could be damaged;

(c) If a component has a large number of pins, it is difficult to apply heat uniformly to all the pins and removing the component while preventing the above items (a) and (b) requires skill and a large number of process steps.

The present invention has been made to overcome the above disadvantages and it contemplates a device processing data such as images that ensures a high level of mounting-strength and is also readily capable of allowing for exchanging a component and upgrading a version.

DISCLOSURE OF THE INVENTION

The present invention provides a data processing device having mounted on a circuit board a non-volatile memory, a microprocessor and a similar electronic circuit device storing a program, data and the like therein, including first and second mounting regions capable of respectively, independently having mounted therein first and second electronic circuit devices storing therein different programs, data and the like, and having their respective terminals connected in parallel, and means for selecting an electronic circuit device mounted in either one of the first and second mounting regions to allow the selected electronic circuit device to be operable.

The present invention in another aspect provides an image processing device having mounted on a circuit board a microprocessor storing a program therein, a non-volatile memory storing dictionary data therein, and a comparison circuit comparing image data input with the dictionary data stored in the non-volatile memory, including first and second mounting regions capable of respectively, independently having mounted therein first and second electronic circuit devices storing therein different programs, dictionary data and the like, and having their respective terminals connected in parallel, and means for selecting an electronic circuit device mounted in either one of the first and second mounting regions to allow the selected electronic circuit device to be operable.

If the data processing device and image processing device that are to be upgraded in version have the first electronic circuit device mounted in the first mounting region they are provided in the second mounting region with the second electronic circuit device upgraded in version. This can eliminate the necessity of providing the stop of removing an electronic circuit device from a circuit board to upgrade the device's current version.

Thus in the present invention there can be provided on a circuit board with a first mounting region as well as a second mounting region corresponding to a spare mounting region for mounting an exchangeable component and there can also be added a function operating only the component mounted in the spare mounting region. As such there can be achieved the following effects:

① An exchangeable component can be soldered and a signal can thus be reliably transmitted to prevent erroneous operation;

② Since an IC socket can be dispensed with the equipment of interest can be miniaturized;

③ Since an IC socket can be dispensed with the cost therefor can be saved;

④ Since it is not necessary to melt solder to remove an unnecessary component, when the device is being improved the copper foil corresponding to a wiring pattern does not peel nor disconnect;

⑤ Since it is not necessary to melt solder to remove an unnecessary component, if the device being used vibrates and receives impact a pattern thereof does not disconnect;

⑥ Since it is not necessary to melt solder to remove an unnecessary component, there can be removed the risk of heating and thus damaging a component that does not need to be changed;

⑦ Since it is not necessary to melt solder to remove an unnecessary component, even those not skilled can provide a system with an additional function or change a function of a system with a reduced number of process steps; and ⑧ A circuit board with a change added thereto has an increased number of components and whether the system has been provided with an additional function, a changed function and the like can be externally, readily determined.

Preferably, the first and second electronic circuit devices are each a non-volatile memory having a possibility of storing therein data different than each other and also storing therein a different program provided for the microprocessor and corresponding to the different data stored in each non-volatile memory, and between the non-volatile memory and the microprocessor there is provided means for transferring a stored content therebetween.

Still preferably, the first and second electronic circuit devices are each a non-volatile memory storing dictionary data therein, having a possibility of storing therein data different then each other and also storing therein a parameter different than each other for a respective microprocessor, and between the non-volatile memory and the microprocessor there can be provided means for transferring a stored content therebetween.

In the present invention in a preferable aspect if a plurality of non-volatile memories, microprocessors and the like need to be changed one component is engaged to store a portion of another component that is changed and between the components there is provided data transfer means. Consequently;

(a) The number of components to be exchanged can be reduced and the step of exchanging components can be performed less frequently;

(b) The number of IC sockets, that of spare mounting regions and the like can be reduced and the equipment of interest can thus be miniaturized and produced as a reduced cost; and (c) The number of components after a change has been made can be reduced and the system can generally operate more reliably.

BEST MODE FOR CARRYING OUT THE INVENTION

Figure 2:
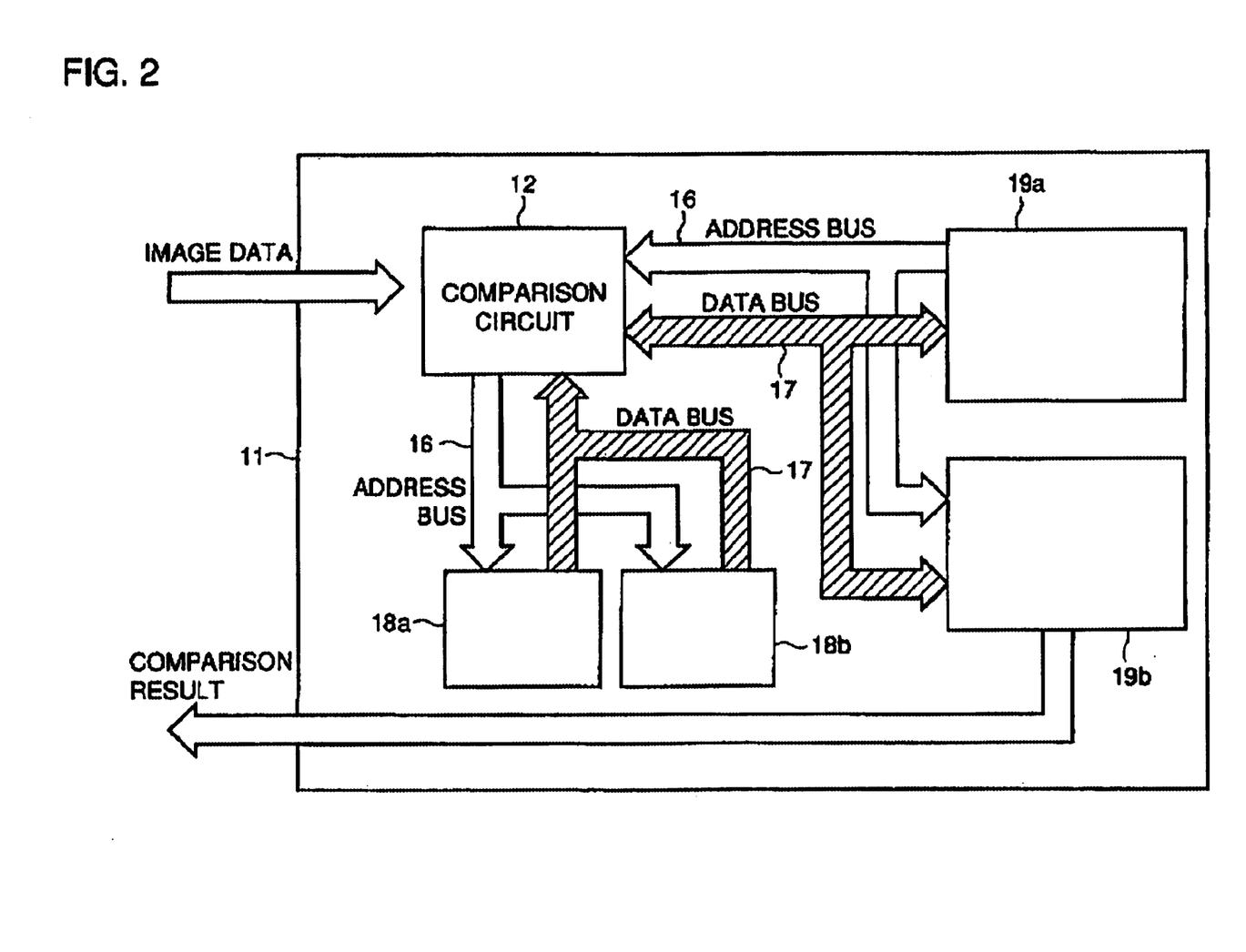
FIG. 2 shows an image processing device in one embodiment of the present invention before a dictionary ROM and a microprocessor are mounted on a circuit board thereof.

Hereinafter the embodiments of the present invention will be described with reference to the drawings. FIG. 2 schematically shows an image processing device in one embodiment of the present invention before a dictionary ROM and a microprocessor are mounted on a circuit board thereof. As shown in the figure, on circuit board 11 a comparison circuit 12 is already mounted. Furthermore circuit board 11 has two mounting regions 18a and 18b for mounting dictionary ROMs thereon and two mounting regions 19a and 19b for mounting microprocessors thereon. Mounting regions 18a and 18b have their respective address terminals connected in parallel via an address bus 16 and their respective data terminals connected in parallel via a data bus 17. Similarly, mounting regions 19a and 19b have their respective address terminals connected in parallel via address bus 16 and their respective data terminals connected in parallel via data bus 17.

Figure 3:
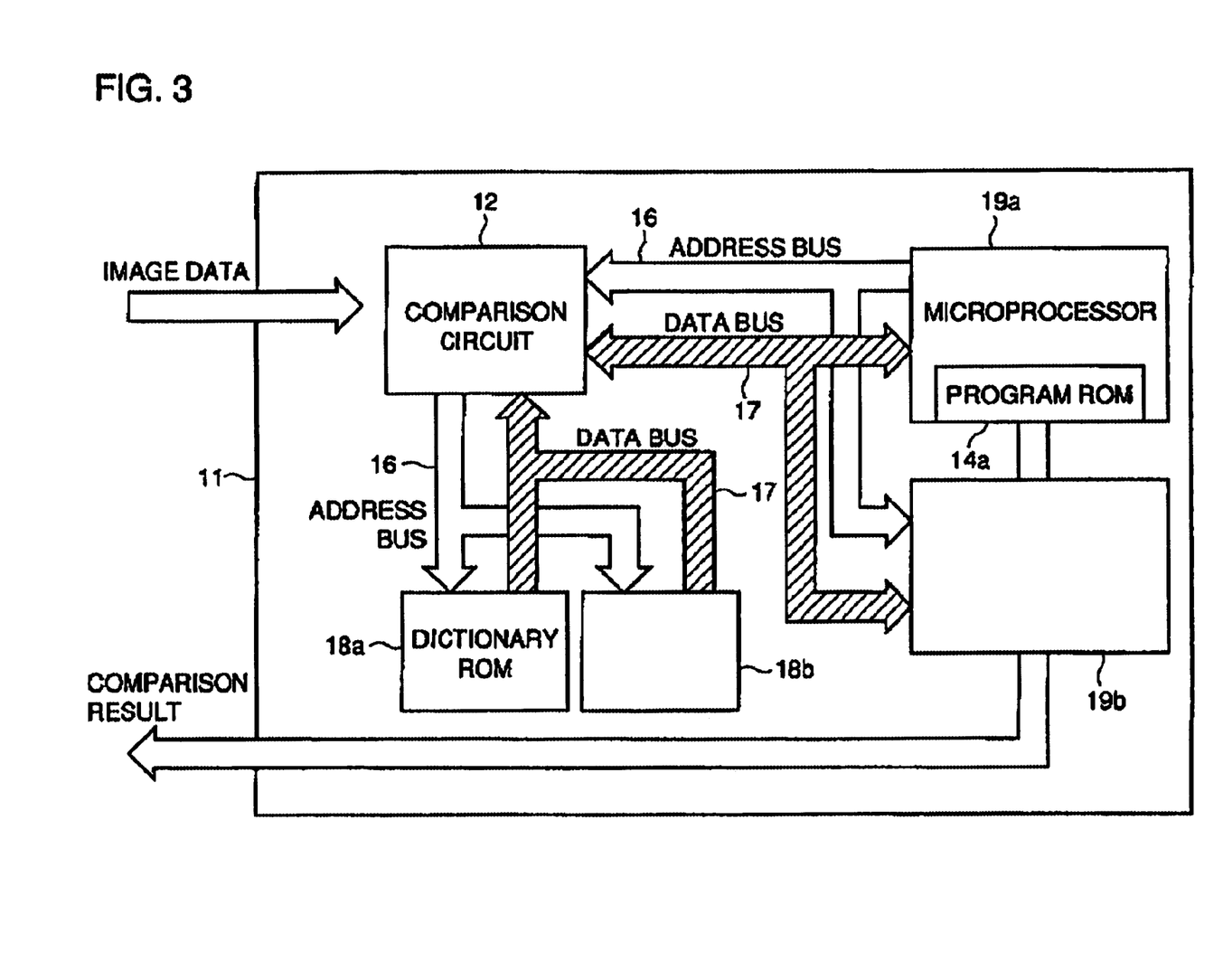
FIG. 3 shows an image processing device in a first version with a dictionary ROM and a microprocessor mounted on a circuit board thereof.
Figure 4:
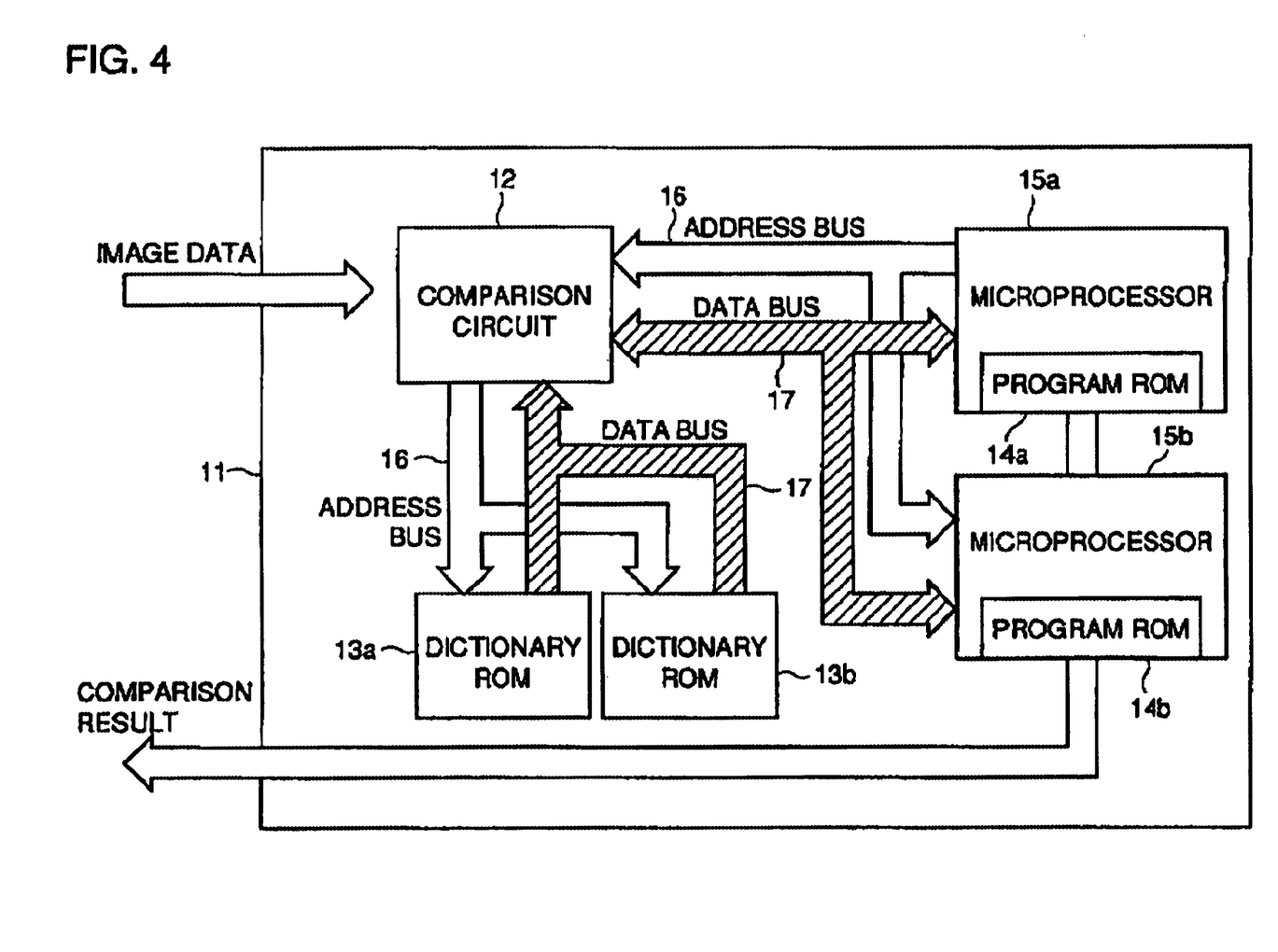
FIG. 4 shows a condition of a circuit board in a version upgraded from the FIG. 3 condition.

In the present embodiment the image processing device in an initial development stage transitions from the FIG. 2 condition to the FIG. 3 condition, i.e., has a dictionary ROM 13a mounted in mounting region 18a and a microprocessor 15a mounted in mounting region 19a. In this condition, neither mounting regions 18b nor 19b have a component mounted thereon. Thus the condition is similar to FIG. 1. If further upgrading the current version is desired, with dictionary ROM 13a and microprocessor 15a remaining mounted a dictionary ROM 13b upgraded in version and a microprocessor 15b upgraded in version are mounted in mounting regions 18b and 19b, respectively, which condition is shown in FIG. 4. In the figure, two dictionary ROMs 13a and 13b are connected in parallel and so are two microprocessors 15a and 15b and accordingly a processing via a circuit is applied to select the new version.

Figure 5:
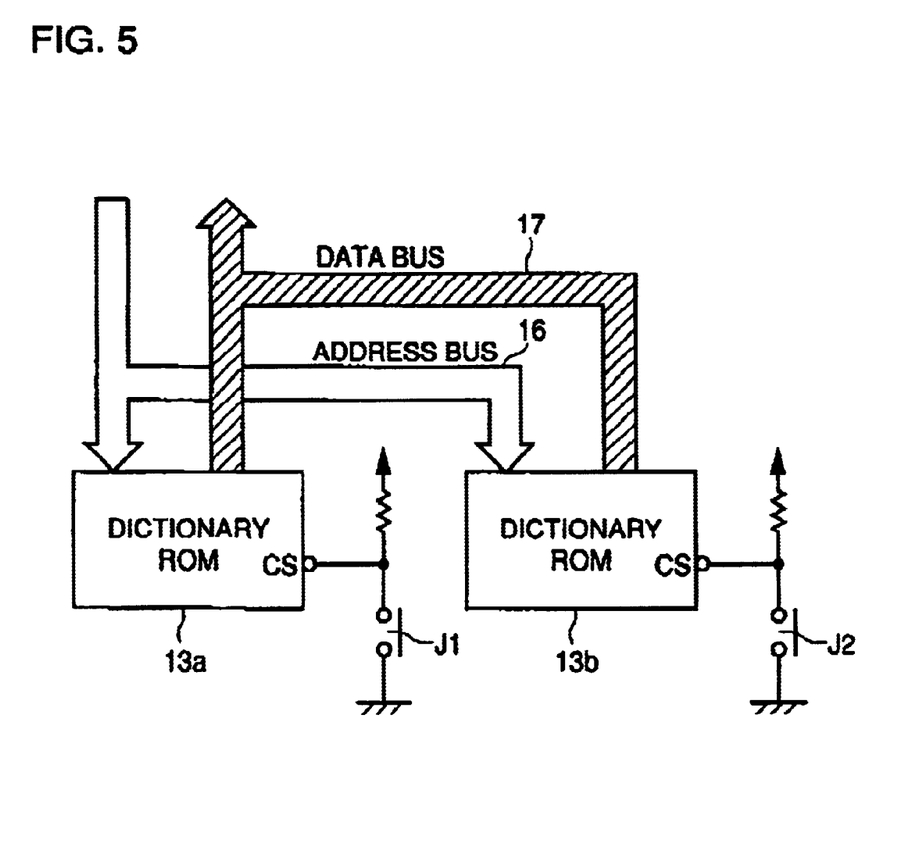
FIG. 5 is a circuit diagram showing a circuit selecting a dictionary ROM in an image processing device in one embodiment of the present invention.

FIG. 5 shows an example of a circuit determining which one of the FIG. 4 non-volatile memory dictionary ROMs 13a and 13b is selected. As has been described previously, an address is provided in parallel and so is data and if there does not exist a select circuit a signal conflict occurs and the circuit does not operate normally. Herein, dictionary ROMs 13a and 13b can have their respective chip select (CS) terminals earthed via jumper lines $J_1$ and $J_2$, respectively.

To select and operate dictionary ROM 13b, via jumper line $J_2$ the dictionary ROM 13b CS terminal is grounded, pulled low, which renders dictionary ROM 13b operable, while the dictionary ROM 13a CS terminal is displaced from jumper line $J_1$, which sets the dictionary ROM 13a CS terminal high to render dictionary ROM 13a inoperable. Microprocessors 15a and 15b can also be selected in the same manner as the FIG. 5 dictionary ROMs are selected.

In the select operation, address bus 16 and data bus 17 may be provided with a switch.

Figure 6:
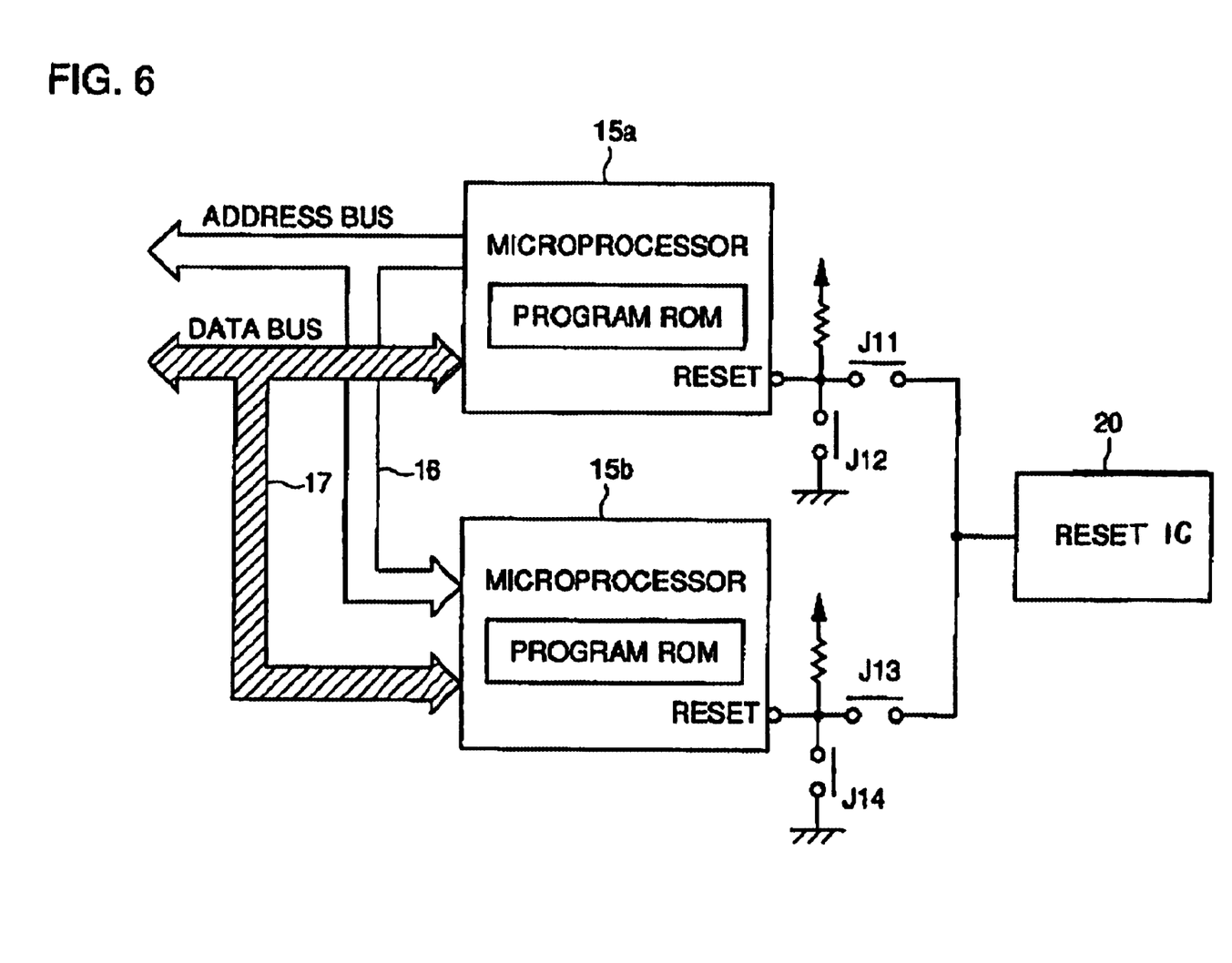
FIG. 6 shows a circuit selecting a microprocessor in an image processing device in one embodiment of the present invention.

FIG. 6 shows an example of a circuit determining which one of the FIG. 4 microprocessors 15a and 15b is selected. In the figure, a reset IC 20 is connected to microprocessors 15a and 15b at their respective reset terminals via jumper lines $J_{11}$ and $J_{13}$, respectively. The microprocessor 15a and 15b reset terminals are connected to a high power supply via a resistor and also connectable to the ground via jumper lines $J_{12}$ and $J_{14}$, respectively.

Reset IC 20 monitors a power supply voltage and for a low voltage provides a low output to stop the microprocessor's operation. Microprocessors 15a and 15b with their reset terminals set low, have their terminals all entering an input mode and stop their operations. To operate microprocessor 15a, normally jumper line $J_{11}$ is connected and jumper lines $J_{12}$, $J_{13}$, $J_{14}$ are opened. Upgrading the current version and operating microprocessor 15b can be achieved simply by connecting jumper lines $J_{12}$ and $J_{13}$ while opening jumper lines $J_{11}$ and $J_{14}$. Such connection allows a high-level signal to be input to the reset terminal of microprocessor 15b to select the microprocessor 15b operation. The microprocessor 15a reset terminal receives a low-level signal and its operation is thus prohibited.

As another example of selecting a microprocessor, a signal switching element may be applied to the address bus, the data bus and any other I/O terminal to switch between the microprocessors.

Figure 7:
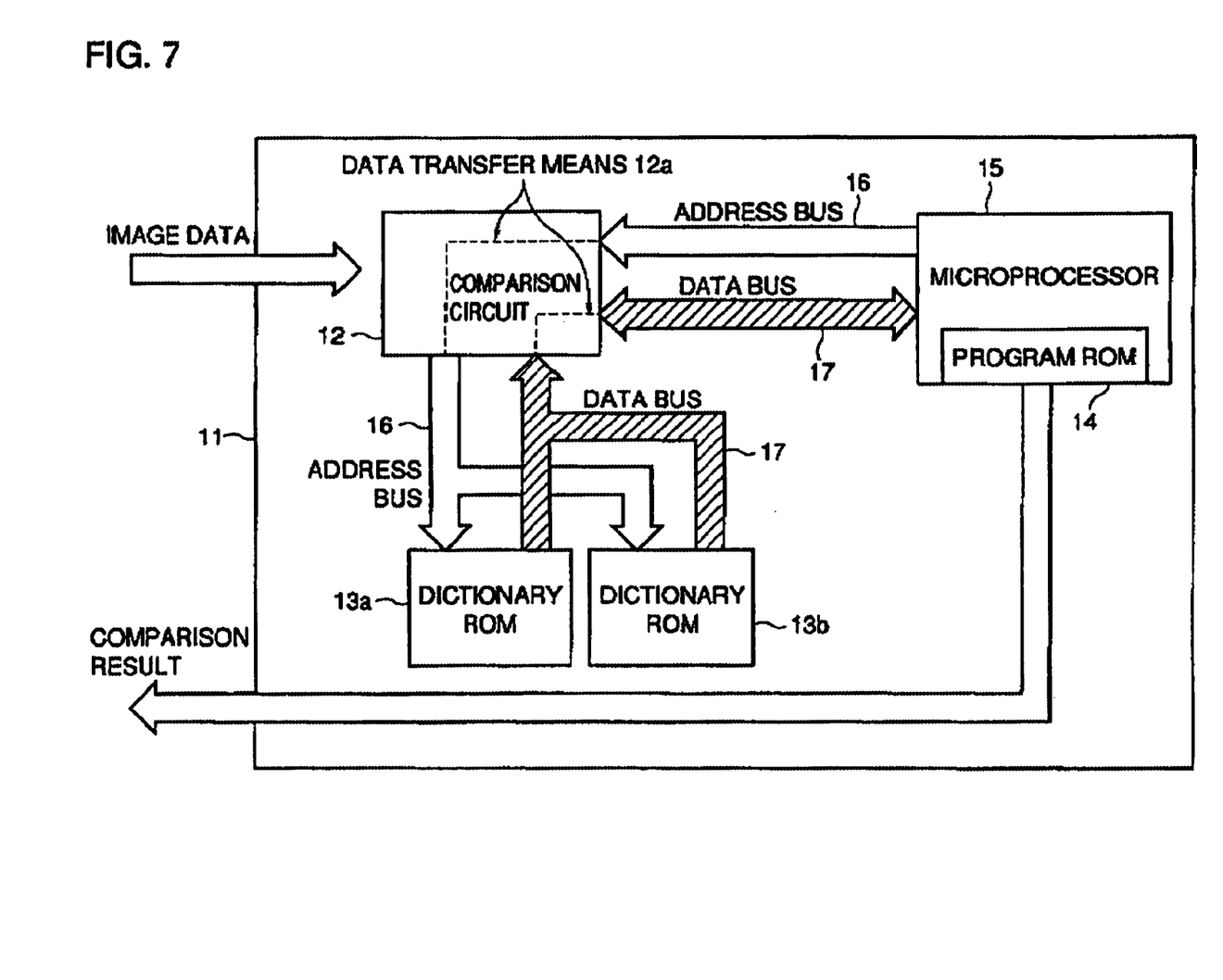
FIG. 7 shows a condition of a circuit board of an image processing device in another embodiment of the present invention after its version is upgraded.

FIG. 7 shows an image processing device in another embodiment of the present invention. The image processing device of the present embodiment is similar to the FIG. 4 device in the circuit board 11 has two dictionary ROM mounting regions and when the current version is to be upgraded two dictionary ROMs 13a and 13b are mounted, although the present image processing apparatus has a single microprocessor and when the current version is to be upgraded and a content of a program of the microprocessor is to be changed the content to be changed is held in dictionary ROM 13b. More specifically, microprocessor 15 can use data transfer means 12a provided in comparison circuit 12, to access the dictionary ROM and thus call the content of the program to be changed, e.g., a parameter table with which the comparison circuit is to be set.

Figure 8A:
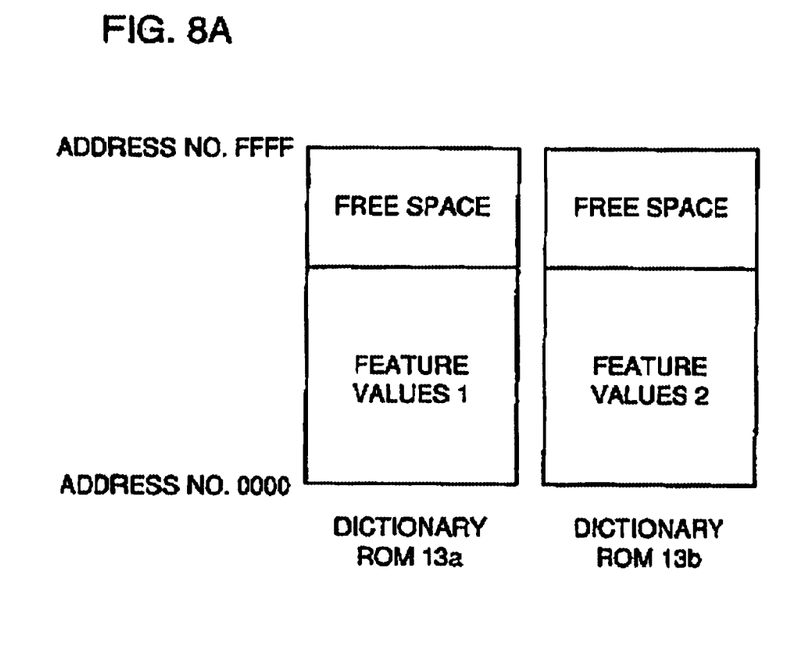
FIGS. 8A and 8B illustrate the dictionary ROM's storage and microprocessor's storage in the image processing device of the FIG. 4 embodiment.
Figure 8B:
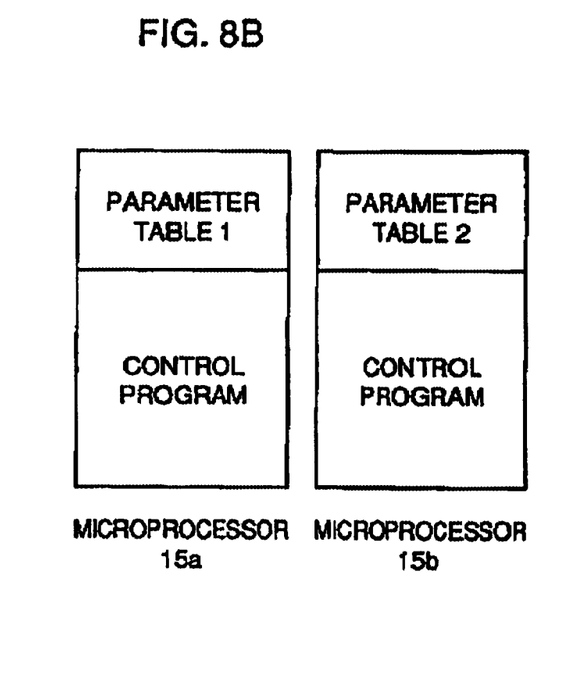
Figure 9A:
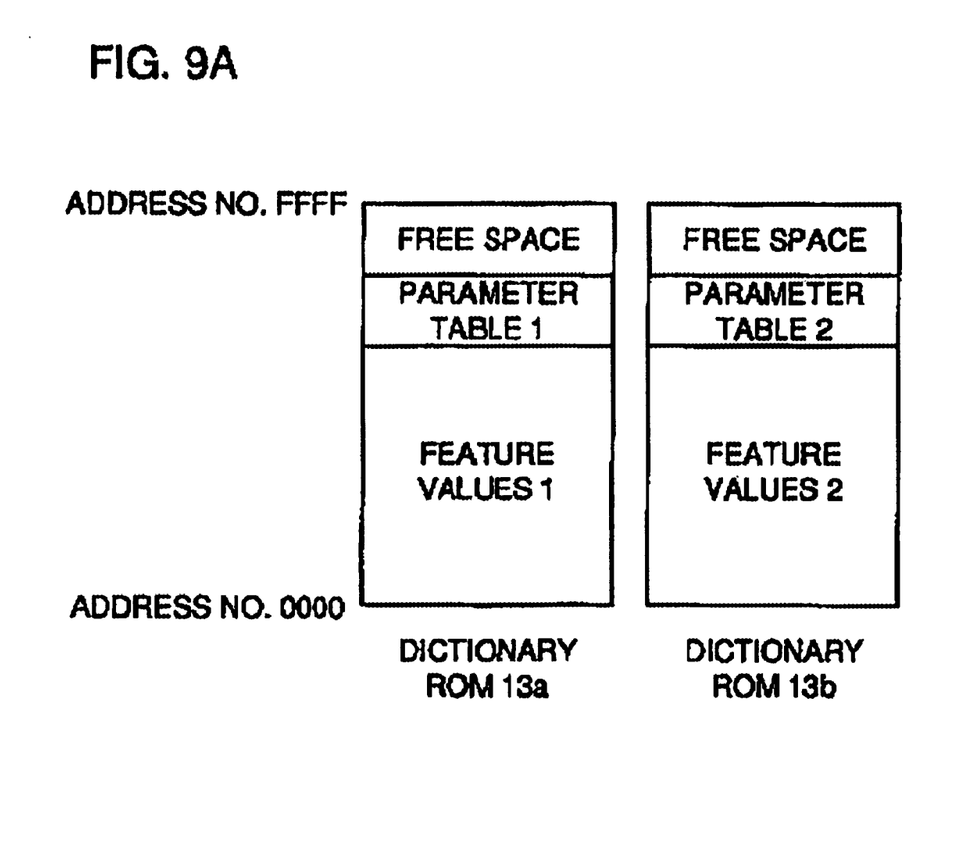
FIGS. 9A and 9B illustrate the dictionary ROM's storage and microprocessor's storage in the image processing device of the FIG. 7 embodiment.
Figure 9B:
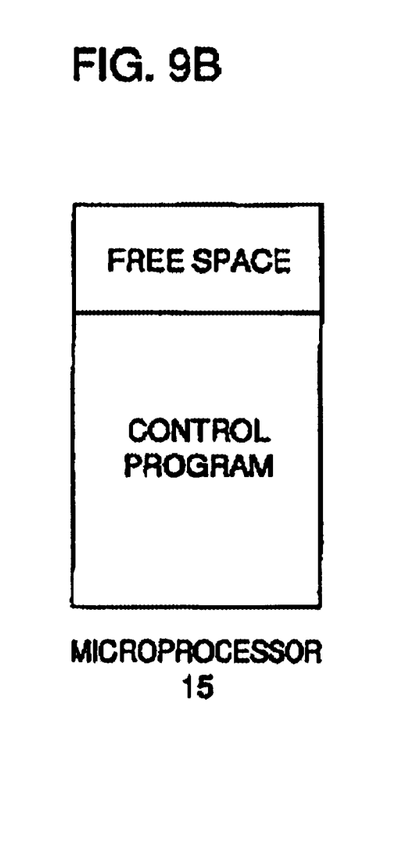

In the FIG. 4 image processing device, dictionary ROMs 13a and 13b are connected in parallel and so are microprocessors 15a and 15b. As such, in their respective storage areas, dictionary ROMs 13a and 13b each store feature values, as shown in FIG. 8A, and microprocessors 15a and 15b each store a parameter table, as shown in FIG. 8B. In contrast, in the FIG. 7 image processing device, as shown in FIGS. 9A and 9B, dictionary ROMs 13a and 13b each store feature values and a parameter table.

If this image processing device is upgraded in version, the current condition with only dictionary ROM 13a mounted is partially changed, i.e., dictionary ROM 13b storing therein feature values 2 and a parameter table 2 both upgraded in version is mounted in a second mounting region or spare mounting region 18b.

Figure 10:
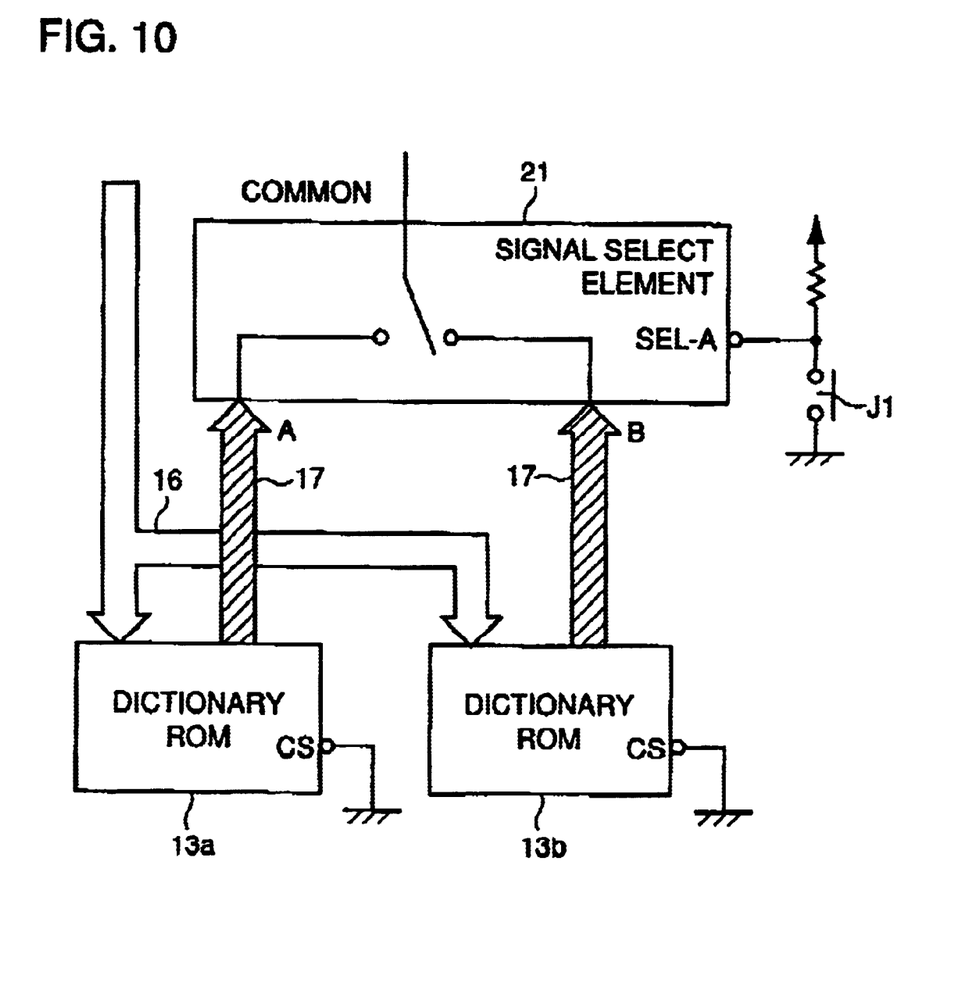
FIG. 10 is a circuit diagram showing another exemplary circuit selecting a dictionary ROM in the image processing device in the above each embodiment.

FIG. 10 is a circuit diagram showing another example of selecting a dictionary ROM via a circuit. Herein, there is provided a signal select element circuit 21, with a common data bus entering therein and switched thereby to select either one of dictionary ROMs 13a and 13b to add data. Signal select element circuit 21 has an SEL-A terminal and when the SEL-A terminal is set low the dictionary ROM 13a data bus is selected and when the SEL-A terminal is set high or jumper line $J_1$ is displaced dictionary ROM 13b is selected. While herein the FIG. 10 select circuit is applied to select a dictionary ROM, it is similarly applicable to each terminal of a microprocessor.

The above embodiments have been described with reference to an image processing device, the present invention is also applicable to any other data processing devices including a non-volatile memory storing data and a microprocessor storing a program.

Industrial Applicability

As has been described above, the present image processing device can be provided on a circuit board with a first mounting region as well as a second mounting region corresponding to a spare mounting region for mounting a component that needs to be changed and it can also have added thereto a function operating only the component mounted in the spare mounting region. As such, the component can be soldered. Thus the device can transfer a signal reliably and thus be free of erroneous operation.

What is claimed is:

1. A data processing device comprising:
   a circuit board having first and second mounting regions with respective terminals connected in parallel;
   a first electronic circuit storing information therein mounted directly to the circuit board in said first mounting region; and
   means for selectively disabling said first electronic circuit mounted in said first mounting region,
   wherein said second mounting region is configured to mount therein directly to the circuit board a second electronic circuit representing an upgrade of said first electronic circuit.

2. The data processing device of claim 1, wherein said first electronic circuit includes a microprocessor and a non-volatile memory for storing therein data and also storing therein a program provided for the microprocessor, and that between the non-volatile memory and the microprocessor there is provided means for transferring a stored content therebetween.

3. An image processing device comprising:
   a circuit board;
   a first microprocessor storing a program therein, and a first non-volatile memory storing dictionary data therein, mounted directly on the circuit board;
   a comparison circuit comparing image data input with the dictionary data stored in the non-volatile memory, mounted on the circuit board;
   first and second spare mounting regions configured to respectively, independently have mounted therein, directly to the circuit board, a second microprocessor and a second non-volatile memory for replacing said first microprocessor and said first non-volatile memory, the first and second spare mounting regions having their respective terminals connected in parallel to the first microprocessor and the first non-volatile memory; and
   means for selectively disabling said first microprocessor and said first non-volatile memory.

4. The image processing device of claim 3, further comprising means for transferring a stored content respectively between the first or second non-volatile memory and the first or second microprocessor.

5. The image processing device of claim 3, wherein said means for disabling uses switching means to switch a data bus or an address bus.

6. A data processing device comprising:
   a circuit board;

a first non-volatile memory and a first microprocessor mounted directly on the circuit board;

first and second mounting regions respectively having mounted therein, directly on the circuit board, a second non-volatile memory and a second microprocessor, and having their respective terminals connected in parallel to said first non-volatile memory and said first microprocessor; and means for changing operability only from said first non-volatile memory to said second non-volatile memory and from said first microprocessor to said second microprocessor.

7. A data processing device comprising:

a circuit board;

a first non-volatile memory and a first microprocessor mounted directly on the circuit board;

first and second mounting regions configured for respectively, independently having mounted therein, directly on the circuit board, a second non-volatile memory and a second microprocessor, the first and second mounting regions having their respective terminals connected in parallel to the first non-volatile memory and the first microprocessor; and means for selectively disabling said first microprocessor and said first non-volatile memory, wherein said means for disabling selectively disables a chip select terminal of said first microprocessor and said first non-volatile memory.

8. A data processing device according to claim 6, wherein said first non-volatile memory stores data different than data stored in said second non-volatile memory.

9. A data processing device according to claim 6, wherein said first microprocessor stores a program different than a program stored in said second microprocessor.

* * * * *